UNITED STATES PATENT OFFICE.

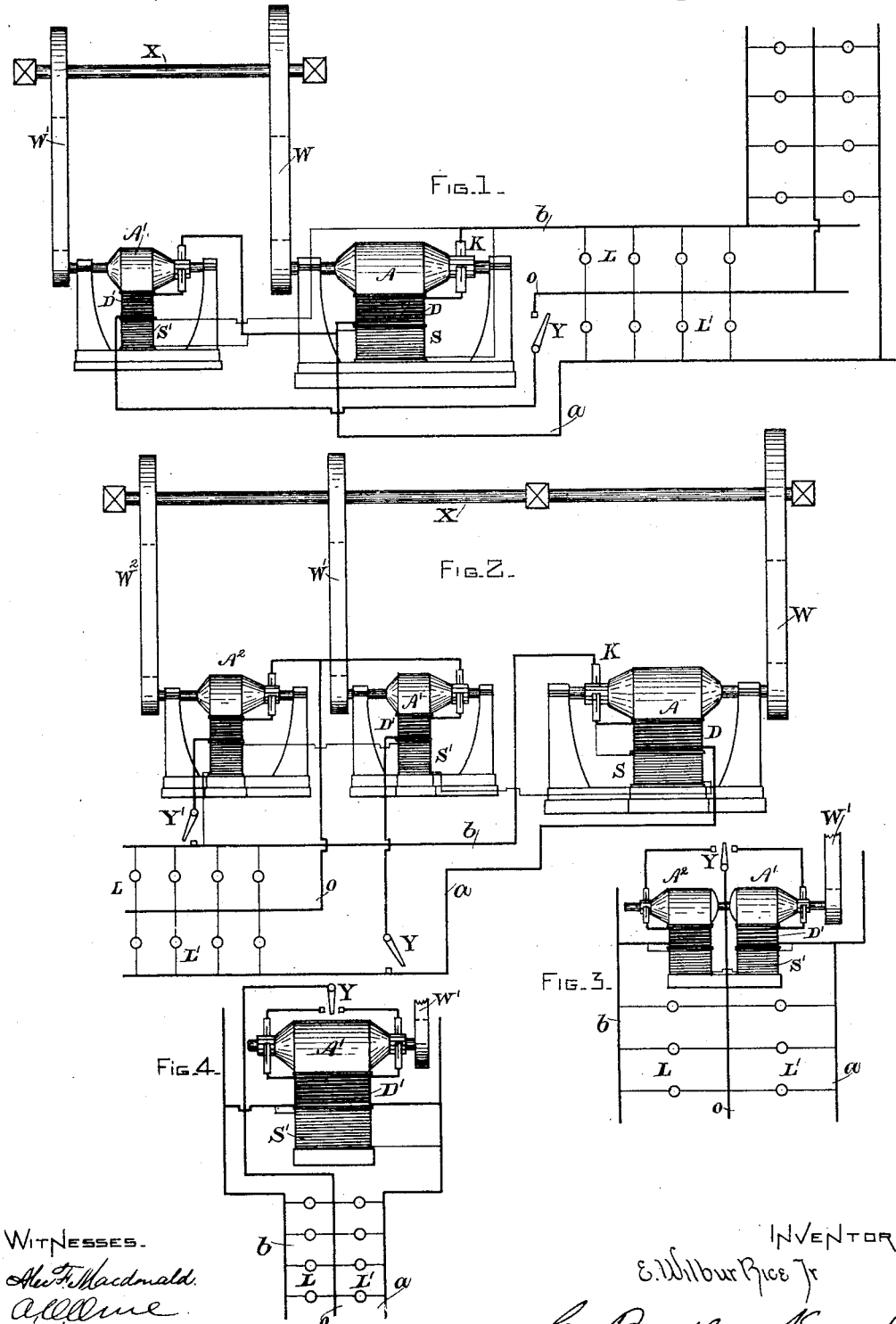

EDWIN WILBUR RICE, JR., OF LYNN, MASSACHUSETTS, ASSIGNOR TO THE THOMSON-HOUSTON ELECTRIC COMPANY, OF CONNECTICUT.

SYSTEM OF ELECTRICAL DISTRIBUTION.

SPECIFICATION forming part of Letters Patent No. 460,364, dated September 29, 1891.

Application filed February 13, 1891. Serial No. 381,276. (No model.)

*To all whom it may concern:*

Be it known that I, EDWIN WILBUR RICE, Jr., a citizen of the United States, residing at Lynn, in the county of Essex and State of Massachusetts, have invented a certain new and useful Improvement in Systems of Electrical Distribution, of which the following is a specification.

My present invention relates to a system of electric distribution in which the lamps or other translating devices are arranged in what is known as "multiple series"—that is, one group of lamps arranged in parallel is in series with a corresponding group, the individual lamps of which also are in multiple. In such a system the resistance of the two groups must be kept approximately equal in order that each translating device may receive neither more nor less than a given normal amount of current, and to preserve this relation constant, or, as it is often called, "to maintain the system balanced," notwithstanding the switching in or out of individual translating devices, different methods of compensation have been proposed and are well known. For instance, the use of a compensator transferring energy from the lighter to the more heavily loaded side of the circuit has been proposed, as also have motors shunting each side and returning the surplus energy back to the main generator.

My system is based on somewhat the same principle as the last named; but great simplification is gained, because the same machine may, when desired, be used to restore the balance, no matter which side is the more heavily loaded, the machine serving at one time as a motor and again as a generator. This equalizing-machine will be coupled mechanically with the main generator, and will therefore draw power from or return it to the same initial source of energy.

The arrangement of circuits and construction of the equalizing-machine, so that it fulfills the functions both of motor and generator, according to the condition of the work-circuit, will be described hereinafter, and are illustrated in the accompanying drawings, wherein—

Figure 1 represents in diagram a system making use of a single equalizing-machine, and Figs. 2, 3, and 4 are similar diagrams of different arrangements in which two such machines may be employed.

In the views, and referring for the present to Fig. 1, A represents the main generator supplying current to the distributing system. It may be shunt-wound or compounded in the usual manner, S representing the shunt-winding, and D the direct winding. To the terminals of the machine at commutator K are connected the outer mains $ab$ of the distributing system, $o$ being the intermediate, or, as it is sometimes called, the "compensating," wire. One group L of lamps in parallel are coupled between $b$ and $o$ and a second similar group L′ between $a$ and $o$, the two groups of course being in series. Such a system when both sides are equally loaded will operate with perfect satisfaction, provided the wiring is done in accordance with known laws; but should inequality of load on the two sides occur there will be a rise of potential on the more lightly-loaded side and a decrease on the heavily-loaded side. To compensate for this and avoid the evil results attendant thereon, I provide means for causing a current to flow over the middle wire, which in the one case drives the equalizer as a motor and in the second case is generated by it in its capacity as a generator. To explain how this is done, let X be a shaft which drives the generator A by belt W. This shaft is also belted at W′ to a comparatively small accessory machine A′, herein commonly spoken of as the "equalizer." This latter machine has one of its terminals connected to the main $a$ and its other terminal to the intermediate wire $o$ through a direct field-magnet winding D′. An initial excitation of the field of this machine is secured by a winding S′ in shunt across the generator-mains; but this may be replaced by other means of excitation, or, in fact, any arrangement securing a practically constant initial magnetism, which is cut down or increased by the current present in winding D′, according to the direction of flow. Consequently, as will be understood from the connections described, the field-magnetism of the equalizing-machine will be varied in accordance with variations of load in the two mutiple-arc groups.

Taking up now the mode of operation of my invention, let it be supposed that there are fewer lights in group L' than on the other side L and the switch Y closed, completing the circuit through the equalizing-machine. The machine A' will now take current through its armature, its field will be cut down by the reversed current passing through D', wound oppositely to S', and as a result more current is taken through the armature. The machine then becomes an active motor driven by the current fed between mains $a\,o$ by way of switch Y, and returns power to the driving-shaft through the belt W', thereby saving energy which would otherwise be delivered to the lightly-loaded side at the risk of burning out the lamps. At the same time the heavily-loaded side acquires its normal voltage. The adjustment of the windings and their value in determining the magnetism of the equalizing-machine are of course matters for experiment in each case. As the differences of load for which compensation must be made are only a small proportion of the total load, the capacity of the machine A' will be much smaller than that of the main generator. If desired, the main and equalizing machines may be mounted on the same shaft, or other mechanical connections employed, so that both are coupled with the same source of energy. Again, if L be the lightly-loaded side the current flowing in D' will be in the same direction as S' and increase the initial excitation of the field, so that a reversal of the field will occur, and the equalizing-machine, becoming a generator, will deliver current to the heavily-loaded side, drawing the necessary power from the main driving-shaft.

In Fig. 2 are shown two equalizing-machines A' A² in addition to the main generator A. The machines are all geared to a common driving-shaft X by belts W' W², and the equalizing-machines, when switches Y Y' are closed, are connected to the mains $a\,b$ in such a way that each forms a shunt around one of the groups L L'. The windings of the different machines are the same as already described in connection with Fig. 1, and therefore do not need specific mention. In this case either one of the machines may act as a motor, while its companion acts as a generator, thereby compensating for differences of load and drawing power from or returning it to the main shaft X, which, as before, drives the main generator A.

In Fig. 3 there is shown a combination of the two machines A' A², with their armatures mounted on a common shaft, so that a single pulley suffices to make the necessary transfer of power between the equalizing-machines and main driving-shaft. The windings and arrangement of circuits is the same as before; but in this modification the switch Y is so arranged that either machine may be thrown into or out of action at will.

In Fig. 4 the two machines A' A² are in reality combined in a single one—that is, instead of using two separate armatures, as in Fig. 3, one armature, with two separate windings, is provided, and by throwing the switch Y either winding may be brought into circuit to effect the desired regulation.

Of course either of the machines illustrated in Figs. 3 and 4 has the same double capacity for use either as a motor or generator which the machine A' in Fig. 1 has, and it is for this reason that the modifications are illustrated, for I am aware that it is not broadly new to provide two motors, each shunting one branch of a system of distribution, such as herein contemplated, and which act alternately to return surplus energy to the main generator, according as the one side or the other carries the greater load.

What I claim as new, and desire to secure by Letters Patent, is—

1. The combination of a multiple-series distribution system with an equalizing-machine connected in shunt around one of the multiple-arc groups and serving as a motor or generator, according as the major load shifts from one side to the other side of the system, said machine being coupled mechanically with the main generator, so as to return and receive power from the same source of energy.

2. The combination of a multiple-series distribution system with an equalizing-machine connected in shunt around one of the multiple-arc groups and acting as a motor when the shunted side has the lighter load, but as a generator when it has the heavier load, as described.

3. The combination of a multiple-series distribution system with an equalizing-machine connected in shunt around one of the multiple-arc groups and coupled mechanically with the main generator, said machine being so wound that its field is reversed according as the shunted side has the lighter or heavier load, thereby causing it to act both as a motor and generator, as set forth.

4. The combination of a multiple-series distribution system with an equalizing-machine shunting one side of the system and coupled mechanically with the main generator, said machine having a certain definite excitation, which is cut down or increased in accordance with the direction of current flowing through the machine, thereby maintaining the system balanced.

5. The combination of a multiple-series distribution system with two equalizing-machines, both coupled mechanically with the main generator and each shunting one side of the system, and a switch making or breaking the circuit with either machine at will, as set forth.

In testimony whereof I have hereto set my hand this 7th day of February, 1891.

EDWIN WILBUR RICE, JR.

Witnesses:
JOHN W. GIBBONEY,
HENRY N. SWEET.